United States Patent
Feisel

(10) Patent No.: US 6,565,418 B1
(45) Date of Patent: May 20, 2003

(54) METHOD AND MACHINE FOR THE MACHINING OF PRE-MACHINED TOOTHED WORKPIECES SUCH AS GEARS

(75) Inventor: Armin Feisel, Schaffhausen (CH)

(73) Assignee: Reishauer AG, Wallisellen (CH)

( * ) Notice: Subject to any disclaimer, the term of this patent is extended or adjusted under 35 U.S.C. 154(b) by 0 days.

(21) Appl. No.: 09/857,694

(22) PCT Filed: Dec. 8, 1999

(86) PCT No.: PCT/CH99/00589

§ 371 (c)(1),
(2), (4) Date: Jun. 8, 2001

(87) PCT Pub. No.: WO00/35621

PCT Pub. Date: Jun. 22, 2000

(30) Foreign Application Priority Data

Dec. 14, 1998 (DE) .......................................... 198 57 592

(51) Int. Cl.⁷ ............................................... B24B 49/00
(52) U.S. Cl. .............................. 451/10; 451/11; 451/47; 451/900; 451/56; 451/253
(58) Field of Search ................................ 451/9, 10, 11, 451/47, 54, 56, 900, 253, 246, 332, 339

(56) References Cited

U.S. PATENT DOCUMENTS 4,519,733 A    5/1985  Gregg ........................... 409/7
4,815,239 A *  3/1989  Sommer
5,108,117 A *  4/1992  Crossman et al. .......... 279/126
6,315,646 B1 * 11/2001 Hoyashita ..................... 451/65

FOREIGN PATENT DOCUMENTS

| DE | 40 19 834 A1 | 1/1992 | ............ B23F/23/00 |
| DE | 43 08 676 C2 | 9/1994 | ............ B23Q/7/04 |
| DE | 195 01 080 A1 | 7/1996 | ............ G01B/21/22 |
| DE | 296 17 120 U1 | 4/1997 | ............ B23F/19/00 |
| DE | 196 24 842 A1 | 1/1998 | ......... B24B/53/075 |

OTHER PUBLICATIONS

German Search Report.

* cited by examiner

*Primary Examiner*—Eileen P. Morgan
(74) *Attorney, Agent, or Firm*—Sughrue Mion, PLLC

(57) ABSTRACT

A grinding worm (4) on a grinding spindle is driven in a rotating manner. On a rotatable plate (7), two workpiece spindles (6a, b) are positioned at a distance from one another and driven in a rotating manner. The one workpiece (5) is ground with the grinding worm (4), while on the other spindle (6b) a ground workpiece (8a) is exchanged for an unmachined part (8b) using a loader (10). Each spindle (6a, b) has a corresponding centering probe (9a, b). By means of the signal of the probe and a control mechanism, the newly clamped-on workpiece (8b) is centered before the rotating plate (7) is rotated into the position, in which this toothed gear (8b) can be brought into a mesh with the grinding worm (4). In such a way, the unproductive times can be largely reduced.

8 Claims, 3 Drawing Sheets

METHOD AND MACHINE FOR THE MACHINING OF PRE-MACHINED TOOTHED WORKPIECES SUCH AS GEARS

BACKGROUND OF THE INVENTION

The invention relates to a process and a machine for the machining of pre-machined cogged or toothed workpieces, especially gears.

Pre-machined toothed or cogged workpieces are used in all technical areas. In many cases, the gear teeth are pre-machined and finished, after heat treatment, by means of, for example, grinding. In the case of automated machining, the problem of finding the pre-machined gear tooth gap exists, which is to allow for collision-free entrance of a finishing tool which may be a grinding wheel or a grinding worm. In present machines, which have only one spindle for clamping the workpiece, the problem is solved by known means of, for example, the scanning of the outer diameter of the gear teeth by means of an inductive sensor. During this so-called centering operation, the workpiece spindle generally rotates with a reduced number of revolutions in comparison to the machining, in order to measure the actual position of all or, at least, several of the tooth flanks, including the right as well as the left tooth flanks. In a subsequent evaluation process, the average value of the actual position is obtained, in order to balance out varying measurement deviations or hardening distortions. The position determined in such a way is specified as the target value of the control, in order to enter the finishing tool into the middle of the gear tooth gap. Afterwards the actual machining process can be started.

In machines which work according to a continuous grinding principle, the workpiece spindle still first has to be accelerated up to machining speed prior to entrance of the grinding worm into the gear tooth gaps of the workpiece and synchronized to angular position of the grinding spindle, before machining can begin.

All of these individual processes, namely workpiece exchange, measurement of the tooth flank positions, calculation of the average value, rotation of the workpiece into the target position and acceleration to the speed for machining, are unproductive times which make ground workpieces expensive.

To grind the gearing of toothed gears in continuous generating grinding, grinding machines with a multitude of NC axes are necessary. The trueing of the grinding worm requires in conventional trueing apparatuses still a number of additional trueing NC axes. A reduction of the number of axes reduces the manufacturing cost and thus the amortization cost which has to be charged onto the ground workpieces.

SUMMARY OF THE INVENTION

It is the object of the invention to reduce the costs of the fine machining of pre-machined toothed or cogged workpieces.

This object is achieved with the present invention which in one aspect, is directed to a process of the machining of pre-machined toothed or cogged workpieces on a finishing machine which comprises a machine base. A first slide is movable on the base. A tool spindle is mounted on the first slide for clamping a finishing tool. A carrier is movably positioned on the base and is movable into at least two positions. At least two workpiece spindles are rotatably mounted on the carrier and driven by one motor each. At least one centering probe is arranged. The centering operation for a collisionfree entrance of the tool into the workpiece tooth gaps is performed on an unmachined workpiece newly placed onto one of the workpiece spindles before the carrier reaches the position in which this unmachined workpiece meshes with the tool.

In another aspect this object is achieved by a machine for machining of pre-machined toothed or cogged workpieces. The machine comprises a base. A tool spindle for clamping a finishing tool is rotatably supported about a first axis and driven by a first motor. A carrier is movable by a second motor into at least two positions. At least two workpiece spindles are rotatably supported on the carrier for clamping a workpiece. Each workpiece spindle is driven by a third motor. Both workpiece spindles are connected to an rotary encoder each. At least one centering probe is arranged for measuring gear tooth flanks of one of the workpiece outside of the position of the carrier, in which this workpiece can be brought into mesh with the tool.

Other aspects of the present invention will become apparent as the description progresses.

BRIEF DESCRIPTION OF THE DRAWINGS

A preferred embodiment of the invention will herein—after be described with reference to the enclosed drawings, in which.

Figure 1:
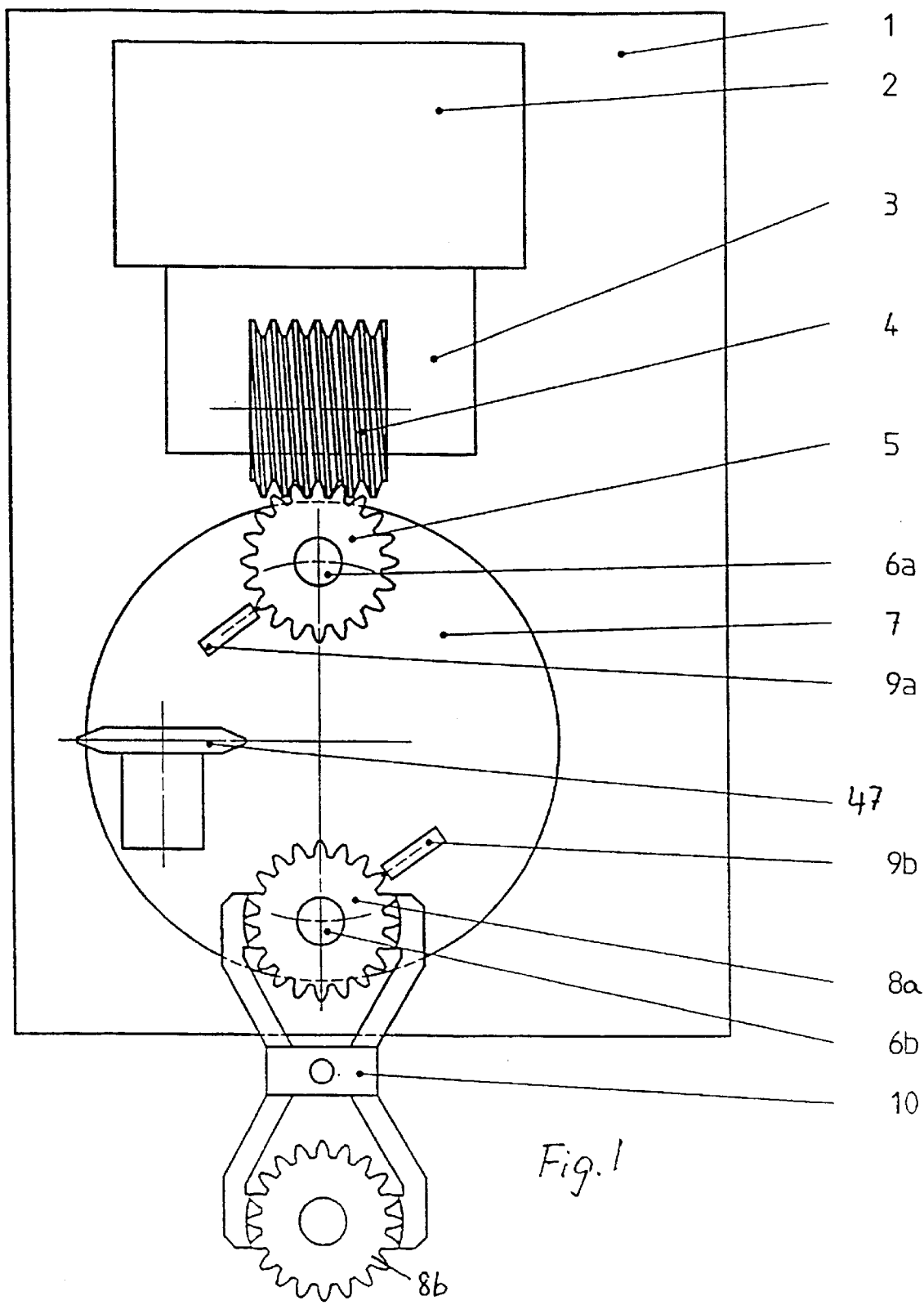
FIG. 1 shows a schematic top view of a toothed-gear grinding machine.

On a machine base 1 a grinding slide 2 with a grinding head 3 is slidably guided, which is carrying a grinding worm 4. The grinding worm 4 machines a workpiece 5 which is clamped onto a workpiece spindle 6a, wherein the workpiece spindle 6a is rotatably suupported on a rotatable plate 7. Located on the rotatable plate 7 is a second workpiece spindle 6b which, on the one hand, serves to exchange an already-machined workpiece 8a for a new unmachined part 8b using a loader 10 during the machining of the workpiece 5; on the other hand, however, it serves additionally, according to the invention, to perform centering without time loss. Centering takes place with the sensors 9a or 9b arranged on the rotatable plate depending on which of the workpiece spindles 6a, b is currently in grinding or loading position. The centering is initiated as soon as the loading process is completed and a new unmachined part 8b has been clamped onto the workpiece spindle 6b. Especially with today's short machining times, this means that no productive time is waisted for the centering, since the centering is a truly parallel process during the grinding process on the workpiece 5 or during the rotation of the rotatable plate 7.

A further reduction in the unproductive time can be achieved by superimposing on both workpiece spindles 6a, b an additional rotation during the rotary motion of the rotatable plate which rotation is opposite to the movement of the rotatable plate but is behavior-wise in such a way synchronized with the movement of the rotatable plate that the workpiece 5 meshes into or out of the grinding worm without collision. In so doing, a retraction and forwarding movement of the grinding slide 2 required after the grinding and before beginning the grinding of the new workpiece only requires merely a small shifting motion to account for the amount of material allowed for grinding in the new unmachined part 8b. Instead of superimposing the additional rotational movement onto the rotation of the workpiece spindles it can also be superimposed onto the constant rotation of the grinding spindle.

Figure 2:
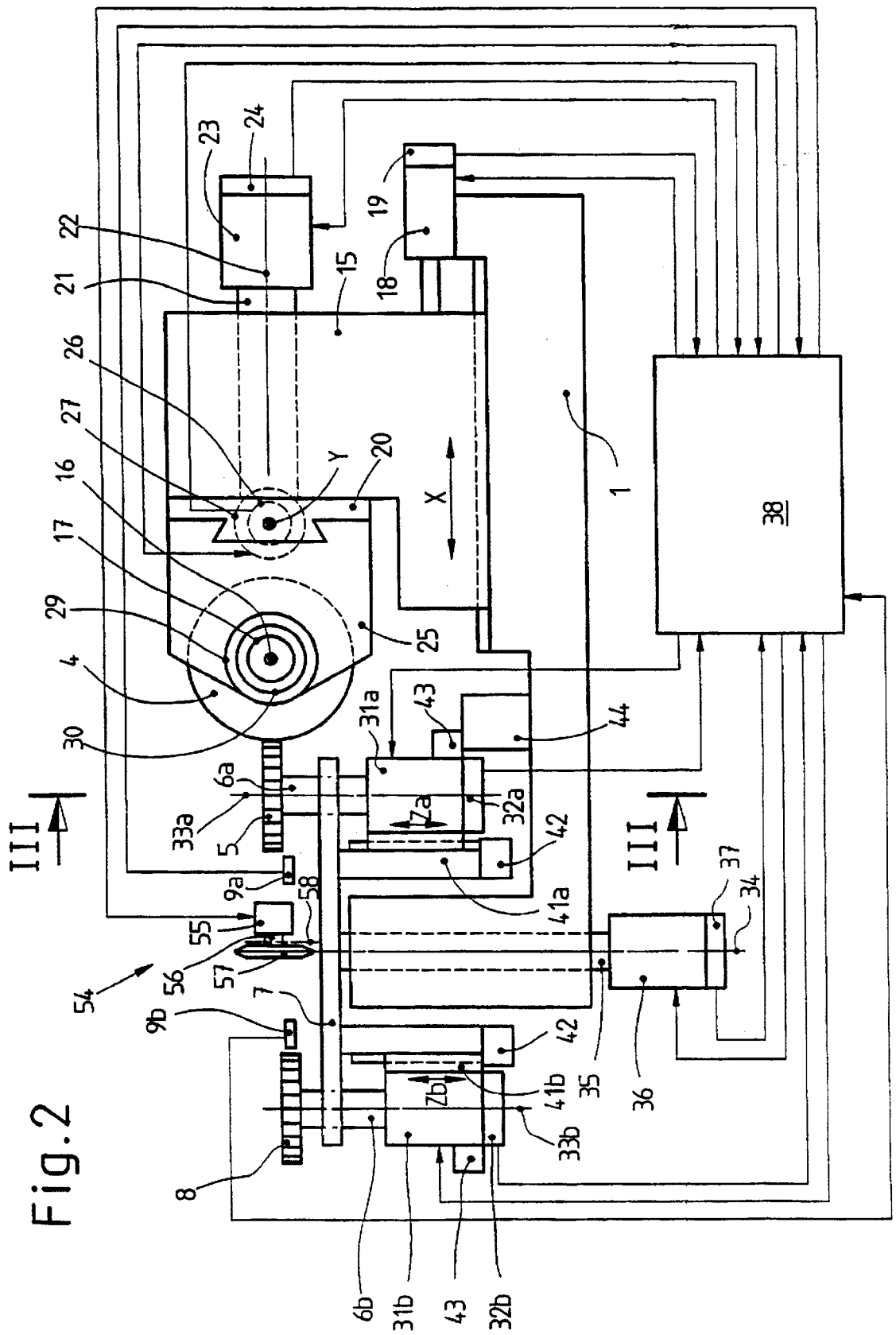
FIG. 2 shows a schematic lateral view.
Figure 3:
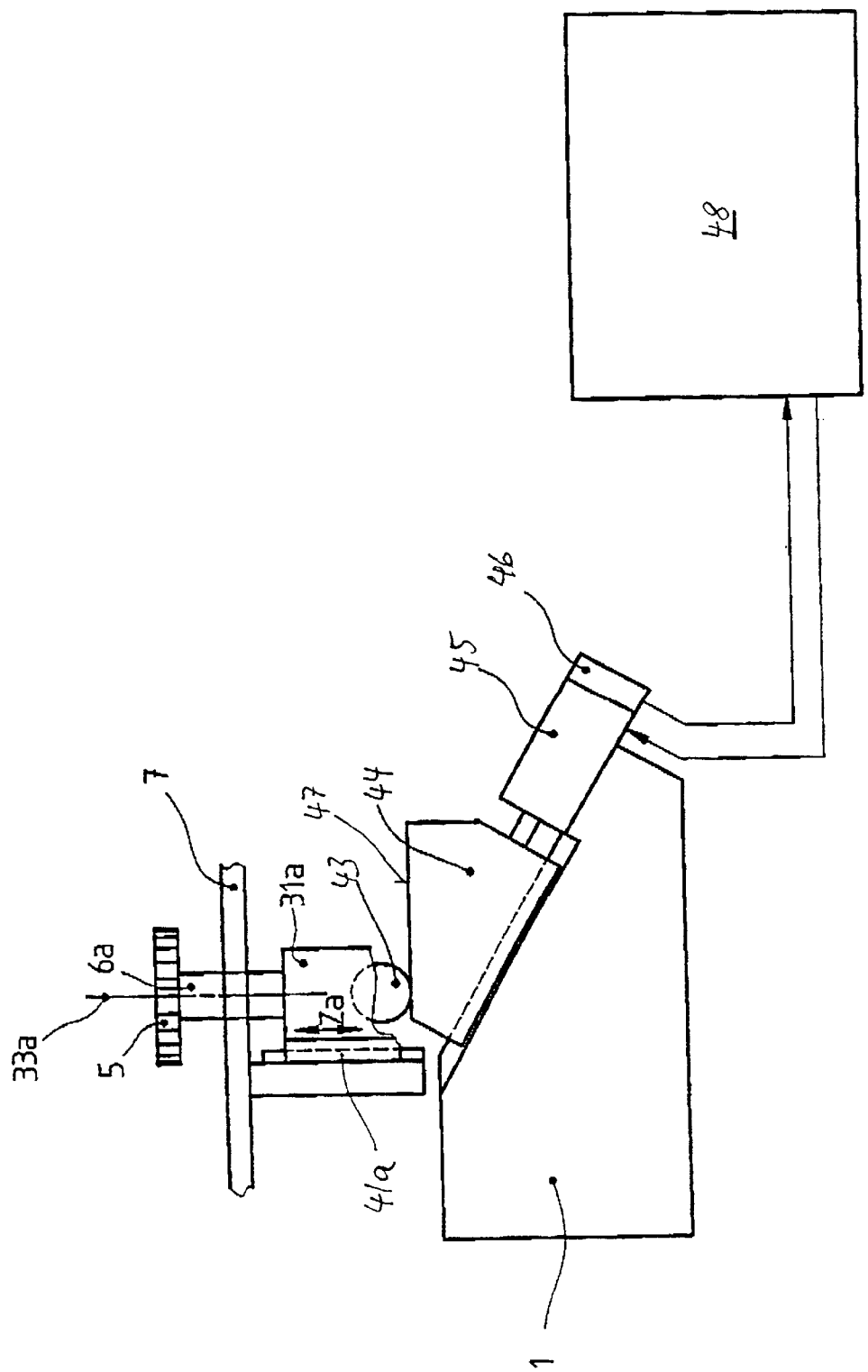
FIG. 3 shows a cross-section along the line III—III in FIG. 2.

As can be seen in FIG. 2, the grinding slide 2 is a cross slide. A first slide 15 is displaceable on the base 1 perpendicular to the axis 16 of the grinding spindle 17 in an advance direction x and is moved by a servomotor 18 with a stroke sensor 19. On the slide 15, a carrier 20 is pivotably mounted and is pivotable by means of a spindle 21 about an axis 22 which perpendicularly crosses the axis 16. The spindle 21 can have a manual setting device for the setting of the tilting angle or, as illustrated, a servomotor 23 with rotary encoder 24. On the carrier 20, a second slide 25 is displaceable parallel to the axis 16. This y-movement of the grinding worm 4 is used for shifting. The slide 25 is moved by an additional servomotor 26 with rotary encoder 27. On the slide 25, the grinding spindle 17 is mounted rotatably and is driven by a servomotor 29 with rotary encoder 30.

Both spindles 6a, b are also driven by a servomotor 31a, b having rotary encoders 32a, b and rotate around the spindle axies 33a, b. The rotatable plate 7 is fixed onto a shaft 35 rotatably supported on the base 1 around an axis 34 which is parallel to the axies 33a, b. The shaft 35 is driven by a servomotor 36 and is connected to an rotary encoder 37.

All motors, rotary encoders and stroke sensors are connected to a control device 38.

In order to achieve the relative movement between workpiece 5 and tool 4 in direction of the axis of the workpiece 5 (z-direction) necessary for the machining over the width of the gear teeth, both of the workpiece spindles 6a, b are rotatably supported on one slide 41a, b each, which slides are slidably supported in z-direction on the rotatable plate 7. The slide guide has a lower stopper 42 which limits the downward movement of the slides 41a, b. On each slide 41a, b, a roll 43 is rotatable around a horizontal axis. In the case of the slide 41a which is in grinding position, there is another slide 44 displaceably mounted on the base 1 in a direction inclined to axes 33a, b and 34. The slide 44 is also moved by a servomotor 45 with rotary encoder 46. It has a horizontal rolling surface 47 which is perpendicular to the axes 33a, b. In driving the slide 44 forward by means of the motor 45, the roll 43 runs on the surface 47 and the slide 41a is lifted from its stopper 42 and shifted in the z-direction. The rotational movement of the rotatable plate 7 is blocked as long as the slide 44 is not pulled back to its starting position in which the roll 43 is lifted off the surface 47.

Because the z-slide 41a, b is separated from the cross slide 15, 25, it can be formed in a more simple, more rigid and less voluminous manner. In this way, the manufacturing cost and the space requirement are reduced. Only a single drive is necessary for both z-slides 41a, b which also reduces the cost.

On the rotatable plate 7, additionally a trueing apparatus 54 is mounted. It comprises a motor 55 with the output shaft 56 onto which a trueing disk 57 is mounted. The trueing disk 57 can, for example, be formed according to DE-A-196 24 842. The trueing apparatus 54 can also be pivotable by means of a not-illustrated motor about an axis 58 which is perpendicular to the axis of the shaft 56. The rotatable plate 7 thus moves into three positions, namely into the illustrated first position, in which the toothed gear 5 meshes with the grinding worm 4, into a position rotated by 180° meshing the toothed gear 8 and into a position rotated by 90° for the trueing of the grinding worm 4 by means of the trueing apparatus 54.

Because the trueing in contrast to the conventional trueing processes takes place at the same position as the meshing of the toothed gear 5, a higher trueing precision can be achieved because deviations from the circular run of the grinding worm 4 are automatically compensated for. The trueing can be performed with the NC slide axes x, y, z which are anyway necessary for grinding, optionally with additional pivoting movements of the trueing apparatus 54 about the axis 58.

Deviating from the illustrated embodiment, the carrier 7 of both of the workpiece spindles 6a, b, instead of rotating about the axis 34, can be sliding linearly into two or three positions. In this embodiment, however, two loaders 10 are necessary.

In case that the centering of the toothed gear 8 can be achieved exclusively while the rotatable plate 7 is standing still, thus during the grinding process of the toothed gear 5, at the toothed gear 8, which is sufficient under certain circumstances, also a single centering probe 9 can be used which, in this case, is rigidly mounted to the machine base 1.

The process according to the invention can also be implemented with other grinding tools than cylindrical grinding worms 4, for example, with grinding disks, wherein, in this case, the gear 5 is indexed, or with globoidal grinding worms with which the toothed gear 5 is machined at the same time along its entire width. In addition it can be implemented in other fine-machining operations of gears, such as honing or shaving, in which the tool must mesh with the pre-machined toothed or cogged workpiece. In these cases the grinding worm 4 is replaced by a honing wheel or a shaving gear.

What is claimed is:

1. A process for the machining of pre-machined toothed workpieces on a finishing machine which comprises a machine base, a first slide movable on said base, a tool spindle mounted on the first slide for clamping a finishing tool, a carrier movably positioned on the machine base which carrier is movable into at least two positions, at least two workpiece spindles rotatably mounted on the carrier and driven by respective motors, and at least one centering probe, said method comprising:

placing an unmachined workpiece on one of said two workpiece spindles;

performing a centering operation on said unmachined workpiece, wherein said centering operation allows the workpiece to mesh with the finishing tool without collision, and further wherein said centering operation is performed before the carrier reaches a position in which said unmachined workpiece meshes with the finishing tool; and machining said unmachined workpiece.

2. The process according to claim 1, further comprising:

rotating, during movement of the carrier, the workpiece spindles;

rotating said tool spindle; and synchronizing said rotation of said workpiece spindles and said tool spindle with movement of the carrier so that the workpieces are meshed or dismeshed respectively with the finishing tool without collision.

3. A machine for machining of pre-machined toothed workpieces comprising:

a machine base, a tool spindle for clamping a finishing tool, which tool spindle is rotatable about a first axis, is mounted to said base and is driven by a first motor, a carrier mounted to said base and movable by means of a second motor into at least two positions, at least two workpiece spindles disposed on said carrier, each of said workpiece spindles being capable of clamping a workpiece;

at least two third motors respectively associated with said at least two workpiece spindles, wherein said at least two workpiece spindles are positioned at a distance from one another and are capable of rotating about respective second axes, wherein said at least two workpiece spindles are connected to respective rotary encoders, and at least one centering probe for measuring gear tooth flanks of one of the workpieces that is not in a position of the carrier in which this workpiece can be meshed with the finishing tool.

4. The machine, according to claim 3, wherein a separate centering probe is provided for each workpiece spindle and the centering probes are mounted onto the carrier.

5. The machine, according to claim 3, wherein the carrier is rotatable about a third axis, and wherein the second axes and the third axis are parallel to one another.

6. The machine according to claim 3, further comprising an automatic workpiece exchanger disposed adjacent to said carrier and capable of exchanging a completed, machined, workpiece with an unmachined workpiece on one of the workpiece spindles on which the workpiece is not in a position to mesh with the finishing tool.

7. The machine according to claim 3, further comprising a trueing device for trueing the finishing tool, said truing device being mounted on the carrier, wherein the carrier is movable into at least three positions, and further wherein, in one of these positions, a trueing tool can be used to true the finishing tool.

8. The machine according to claim 3, wherein each of the workpiece spindles is rotatably mounted on one first slide, wherein each of said first slides is movable parallel to the related second axis on the carrier, and further wherein each first slide comprises a connection element which is engagable with a second slide that is movable on the base.

* * * * *